Aug. 2, 1949.  W. A. RAY  2,477,897
FLUID CONTROL VALVE
Filed July 3, 1944  3 Sheets-Sheet 1
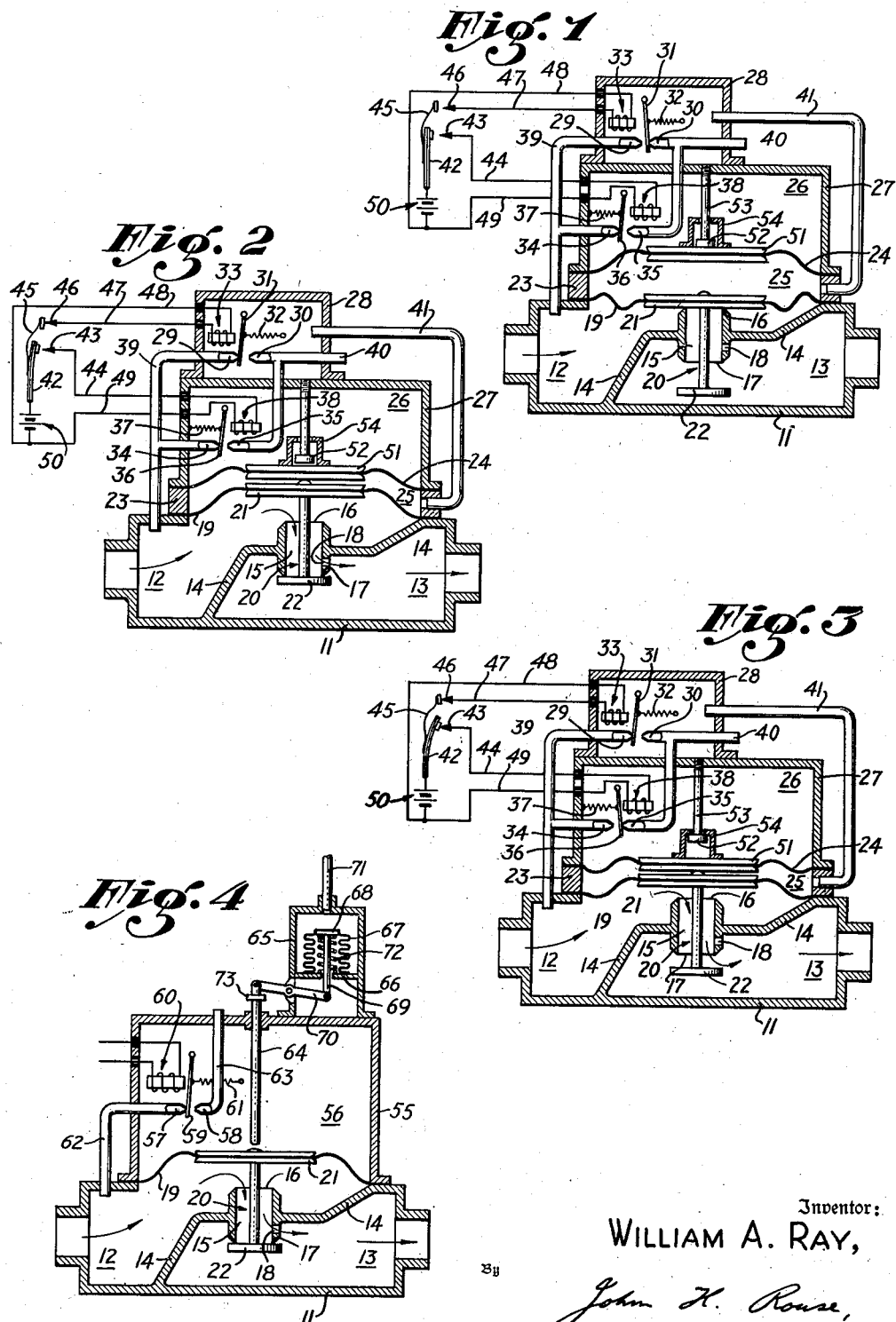
Inventor:
WILLIAM A. RAY,
John H. Rouse,
Attorney.

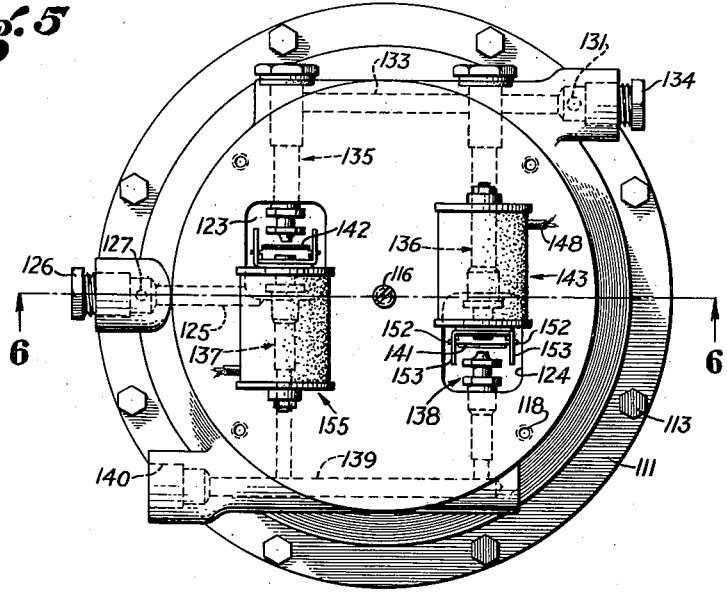

Patented Aug. 2, 1949

2,477,897

UNITED STATES PATENT OFFICE 2,477,897

FLUID CONTROL VALVE

William A. Ray, Los Angeles, Calif., assignor to General Controls Co., a corporation Application July 3, 1944, Serial No. 543,321

6 Claims. (Cl. 137—144)

My present invention relates to fluid control valves, and more particularly to those of the type operated by fluid pressure and controlled by pilot-valve means. Such valves have particular utility for controlling supply of fuel to gas-consuming heating apparatus and, as commonly constructed, are adapted to assume in operation either a fully-open or a closed position. In many heating applications, however, it is desirable that the valve also be capable of providing a restricted flow of fuel so that a "low-fire" condition of a burner may be produced, as well as a "high-fire" condition and complete shut-off. A valve suitable for that purpose is disclosed in U. S. Patent No. 2,317,639, granted to me April 27, 1943, and comprises means whereby the closure member of the valve is balanced in its full-flow position by fluid pressure applied to opposite sides of a flexible diaphragm to which the closure member is connected. The present invention relates to a valve which is also suitable for the purpose described and which constitutes, in some respects, an improvement on the valve of the aforesaid patent.

A main object of this invention is to provide, in a valve of the three-position type described, means whereby the closure member can be positively maintained in each of its flow-controlling positions.

Another object is to provide a valve of the type described which, in its operation in a heating system from closed to restricted-flow position, provides a momentary initial high flow of fuel to the burner to facilitate ignition of the fuel.

Another object is to provide, in a valve having a closure member movable between limiting positions wherein respectively no-flow and restricted-flow through the valve is permitted, and having an intermediate full-flow position; a motor for selectively operating the closure member to said limiting positions; and means, independent of the motor and capable of overpowering the same, for operating the closure member from its restricted-flow to its intermediate full-flow position.

Another object is to apply the independent closure-member operating means, set forth in the preceding object, to a fluid-pressure-operated valve of the simple open-closed type so as to effect movement of the closure of that valve between its fully-open and a restricted-flow position.

Other objects and advantages of the invention will be found in the description, the drawing, and the claims; and, for full understanding of the invention, reference is to be had to the following detailed description and accompanying drawing, wherein:

Figures 1, 2 and 3 are more-or-less diagrammatic sectional views of a valve embodying the invention, together with an electrical circuit and apparatus suitable for controlling the valve; the parts being shown in the several figures in the positions which they assume in operation;

Figure 4 is a sectional view of a modified form of valve according to the invention;

Figure 5 is a plan, with housing 119 removed, of a preferred structural embodiment of the valve shown in Figs. 1–3;

Figure 6 is a section taken generally along the line 6—6 of Fig. 5; and

Figure 7:
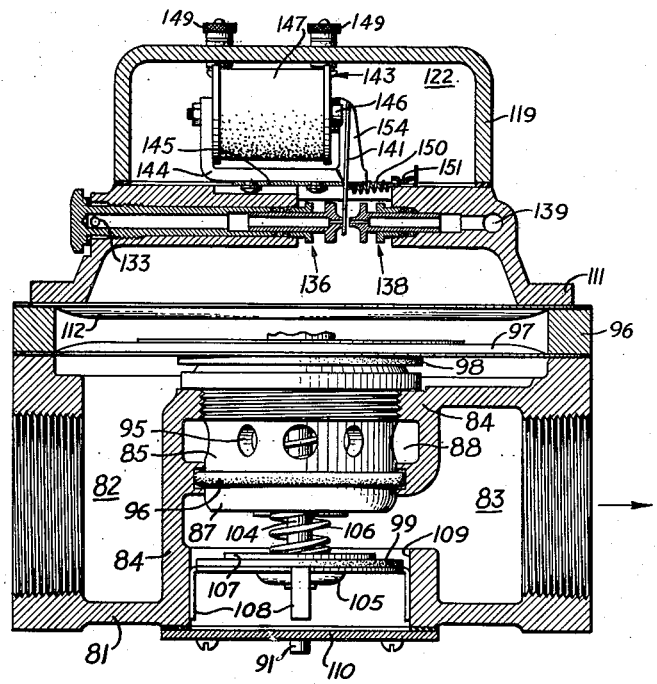
Figure 7 is a section taken along the irregular line 7—7 of Fig. 6.

Referring first to Figs. 1–3 of the drawing, the numeral 11 indicates a valve body or casing having an inlet chamber 12 and an outlet chamber 13 separated by a partition 14 which has a main port opening 15 therethrough. Formed at the upper end of the opening 15 is an inlet valve seat 16, and at its lower end an outlet seat 17. Branching from opening 15 intermediate the seats is a restricted port opening 18. A flexible diaphragm 19, covering an opening through the top wall of the valve body 11, carries a closure member 20 comprising an upper closure 21 and a lower closure 22 cooperable, respectively, with the valve seats 16 and 17. The inlet 12 of the valve body constitutes a first pressure chamber defined in part by the diaphragm 19. Above diaphragm 19, and spaced therefrom at its margin by an annular member 23, is a second flexible diaphragm 24; the space between the diaphragms constituting a second pressure chamber 25. Covering the upper diaphragm 24, and forming therewith a third pressure chamber 26, is a housing 27.

For controlling the pressure in chambers 25 and 26 there is provided a first and a second electro-magnetically-operated three-way pilot valve. The first pilot valve is mounted in a housing 28, joined to the top wall of housing 27, and comprises a pair of jet members 29 and 30 with which a pivoted armature 31 cooperates. This armature is biased by a spring 32 into engagement with jet 30 and is attracted therefrom and into engagement with the other jet 29 upon energization of an electromagnet 33. The second pilot valve is mounted in the chamber 26 and similarly comprises a pair of jet members 34 and 35 and a cooperable armature 36; the armature being biased by a spring 37 into engagement with jet 34 and attractable into engagement with jet 35 by an electromagnet 38. Jets 29 and 34 each communicates, by way of a pipe 39, with the inlet, or first pressure chamber, 12; the other jets 30 and 35 being connected in common to a vent pipe 40 leading to the atmosphere. Connecting the second pressure chamber 25 with the space within housing 28 is another pipe 41.

Control of energization of the electromagnets 33 and 38 is here shown, by way of example, as being accomplished by means of a sequential thermostat which comprises a bimetallic blade 42 which cooperates with a fixed contact 43 connected to one terminal lead 44 of electromagnet 38; the bimetallic blade having a yieldable extension 45 which cooperates with another fixed contact 46 connected to one terminal lead of electromagnet 33. The other terminal leads 48 and 49 of the electromagnets are connected in common to one terminal of a source of electrical energy 50; the other terminal of the source being connected to the bimetallic blade 42.

In describing the operation of the valve shown in Figs. 1–3, it will be assumed, by way of example, that the same is connected in a conduit for supplying gas to the burner of apparatus for heating the space wherein the thermostat (bimetallic blade 42) is located. As shown in Fig. 1, the parts are in the positions which they assume when the heating requirement for the space is fully satisfied, both of the thermostat contacts 46 and 43 then being open. Since both of the electromagnets 33 and 38 are therefore deenergized, the armatures 31 and 36 are in their biased positions in engagement with jets 30 and 34, respectively. Jet 29 being open, the chamber 25, between the diaphragms, is in communication with the inlet 12 through pipe 41, interior of housing 28, jet 29 and pipe 39. The fluid pressure on the upper surface of diaphragm 19 is therefore the same as that on its under surface and, due to the weight of the closure member 20, the upper closure 21 rests on the inlet seat 16, so that fluid flow through the valve is completely obstructed. Since jet 35 is open, the chamber 26 is vented to the atmosphere through pipe 40, and diaphragm 24, due to the pressure in chamber 25 below it, is in a raised position wherein its central plate 51 is in engagement with the head 52 of a rod 53 secured to the top wall of housing 27.

With fall of temperature, the bimetallic blade 42 warps in a right-hand direction so that its extension 45 engages the contact 46; electromagnet 33 then being energized so that armature 31 is attracted into engagement with jet 29 to disconnect chamber 25 from the inlet 12. Jet 30 being simultaneously opened, the fluid compressed in chamber 25 is vented to the atmosphere through pipe 41, interior of housing 28, jet 30 and pipe 40, with the result that the lower diaphragm 19 is forced upwardly by the pressure in the inlet chamber below it; movement of diaphragm 19 being limited by the engagement of closure 22 with the bottom seat 17. The parts are then in the positions shown in Fig. 2, and the gas flows into the port opening 15 and thence, through restricted opening 18 and outlet 13, to the burner to establish a "low-fire" condition thereof. It will be observed that, in its movement from the position shown in Fig. 1 to that of Fig. 2, the closure member passes through an intermediate position (shown in Fig. 3) wherein both ends of the port opening 15 are open, so that there is a momentary full flow of gas to the burner which ensures its proper ignition by the customary pilot burner or other igniting means. Due to the venting of chamber 25, the upper diaphragm 24 tends to fall by gravity, but such movement is arrested by the lower diaphragm upon which the upper diaphragm rests with the head 52 of rod 53 just out of engagement with plate 51.

Assuming that, despite the "low-fire" condition of the burner, the temperature continues to fall, the blade 42 warps farther until it engages contact 43 (extension 45 yielding to permit such movement) so that the electromagnet 38 is also energized. When that occurs, armature 36 is attracted into engagement with jet 35, thereby closing communication between chamber 26 and the vent pipe 40 and permitting fluid from the inlet 12 to enter chamber 26 through the open jet 34. As the pressure in chamber 26 increases, the upper diaphragm 24 is forced downwardly, moving with it the lower diaphragm 19 and the closure member 20; such movement being due to the fact that the pressure above the upper diaphragm is the same as that below the lower diaphragm—chamber 25 is at atmospheric pressure—and gravity is acting on the closure member and both of the diaphragms. The downward movement of the upper diaphragm 24 is limited by engagement of head 52 of rod 53 with the reduced top portion of a hollow member 54 surrounding the lower portion of rod 53 and secured to the diaphragm plate 51; the arrangement being such that, when the upper diaphragm is in its fully depressed position, the closure member is in the full-flow position shown in Fig. 3 so that a "high-fire" condition exists at the burner.

As the temperature gradually rises, thermostat contact 43 opens so that electromagnet 38 is deenergized, the result being that chamber 26 is again vented to the atmosphere and the pressure below the lower diaphragm 19 returns the closure member to its raised position as shown in Fig. 2; flow through the valve then being restricted to an amount only sufficient to produce a "low-fire" condition of the burner. If the temperature continues to rise, electromagnet 33 is also deenergized due to the opening of thermostat contact 46, so that the parts assume the positions shown in Fig. 1 wherein flow through the valve is completely obstructed.

In Fig. 4 is disclosed a modified form of valve having the flow-controlling characteristics of the valve shown in Figs. 1–3. For operating this valve there is provided, in lieu of the compound fluid-pressure motor of Figs. 1–3, a simple fluid-pressure motor and means, independent of the motor, for effecting movement of the closure member from its "second" or restricted-flow position to its "third" or full-flow position. The lower portion (below diaphragm 19) of the valve structure of Fig. 4 is identical with that shown in Figs. 1–3 and the elements which constitute that portion have therefore been assigned the same reference numerals. Mounted in a housing 55 covering the diaphragm 19, and defining therewith a pressure chamber 56, is a three-way pilot valve comprising a pair of jet members 57 and 58 with which a pivoted armature 59 cooperates. As shown in the figure, the armature is held in engagement with jet 57 by the attraction of an electromagnet 60 and is biased toward the other jet 58 by a tension spring 61. Jet 57 communicates through a pipe 62 with the inlet chamber 12, and jet 58 with the atmosphere through another pipe 63.

Since, as shown in Fig. 4, chamber 56 is vented to the atmosphere through open jet 58 and pipe 63, the fluid pressure (to a source of which the valve is assumed to be connected) within the inlet chamber 12 acts on diaphragm 19 to maintain the closure member 20 in its raised position, against the force of gravity acting thereon, with closure 22 in engagement with the outlet seat 17, so that flow through the valve is by way of the restricted opening 18. If the electromagnet 60 is deenergized, armature 59 moves into engagement with jet 58 so that the fluid entering through the open jet 57 soon effects equilization of the pressures above and below the diaphragm and the closure member falls by gravity, flow through the valve then being completely obstructed by the seating of closure 21.

For independently operating the closure member 20 between its restricted-flow and full-flow positions, there is provided a rod 64 which is sealingly reciprocable in an opening, in axial alignment with the closure member, through the top wall of housing 55. For actuating this rod there is mounted on housing 55 a fluid-pressure motor comprising a hollow cylinder 65 having a horizontal partition 66 to which is secured the open bottom end of an expansible-contractible bellows 67. Attached to the head 68 of the bellows, and extending downwardly within the bellows and through an opening in the partition, is a stem 69 which is connected through a pivoted lever 70 to rod 64.

In an opening through the closed upper end of cylinder 65 is a pipe 71 which, to illustrate a specific application of this valve, it will be assumed leads to the space above the water in a boiler heated by a gas burner controlled by the valve. In Fig. 4, the motor bellows is shown compressed, against the force of a spring 72, due to the existence of relatively high steam pressure in the boiler. Since the burner is in a "low-fire" condition (gas flowing only through the restricted opening 18) the steam pressure will gradually diminish, rod 64 moving correspondingly downwardly until it engages the top of closure member 20 and then depresses it so that the bottom valve seat 17 is uncovered, whereupon the flow of gas to the burner is increased. It will be understood that the force of spring 72 is sufficient to overcome the fluid pressure acting upwardly on diaphragm 19. The extent of downward movement of rod 64 is limited by a collar 73 which is so positioned on the rod that when it is in engagement with the housing 55 the closure member is in its full-flow position (as shown in Fig. 3). As the pressure of the steam in the boiler rises, rod 64 is retracted so that the bottom closure 22 is again seated and the burner returned to its "low-fire" condition. Energization of electromagnet 60 may be controlled by a simple open-closed-contact thermostat responsive, for example, to the temperature of a space heated by the steam, so that upon predetermined rise of temperature in the space the electromagnet is deenergized and the valve closes completely in the manner described above.

Various modifications of the valve-operating means disclosed in Figs. 1-3 and Fig. 4 will be apparent to those skilled in the art: for example, the "second" pilot valve of Figs. 1-3 (jets 34—35) could be operated mechanically, instead of electromagnetically, by means responsive to steam pressure or some other condition; or the steam-pressure-operated means of Fig. 4 could be employed to operate switching means controlling the energization of the "second" pilot valve of Figs. 1-3.

Referring now to Figs. 5-7, wherein is disclosed a preferred structural embodiment of the valve of Figs. 1-3, the numeral 81 indicates the base section (corresponding to casing 11 of Figs. 1-3) of a valve casing having an inlet 82 and an outlet 83 (see Fig. 7) separated by a generally L-shaped partition 84. Threaded in a vertical opening through the partition is a hollow cylindrical valve-port member 85, shown in section in Fig. 6, which is formed to provide at its top and bottom ends, respectively, an inlet seat 86 and an outlet seat 87. In the horizontal portion of the partition 84 is a cavity 88 which is in communication, through a vertical opening 89 (Fig. 6), with the outlet 83. Cooperable with the flared bottom end of the opening 89 is a closure 90 secured to a stem 91 which is threaded in an opening through a thickened portion of the bottom wall of the base section; a sealing gland 93 being provided around the reduced outer portion of stem 91. The closure 90 serves as manually-adjustable means for regulating the flow capacity of opening 89. The unthreaded lower portion of the port member 85 is a relatively close fit in an opening through the portion of the partition 84 below cavity 88 and is provided with a rubber ring 94, received within a peripheral groove, for sealing that opening. Through the side wall of the port member 85 is a plurality of holes 95 whereby the interior of the port member communicates with the cavity 88.

Clamped at its margin between the top surface of the base section 81 and an annular member 96 is a diaphragm 97, of flexible material such as leather, rubber or thin metal, which carries a closure member comprising a pair of closures 98 and 99, of rubber or the like, which cooperate respectively with the seats 86 and 87. The upper closure 98 is attached to the underside of the diaphragm by a bolt 100 and is reinforced by metal plates 101 and 102. The lower closure 99 is connected to the diaphragm by a screw 103 threaded in bolt 100 and encompassed by a tube 104. Backing-up the closure 99 is a disk 105, the apertured central portion of which is formed to provide a socket with respect to which the rounded head of screw 103 is rockable to a small degree so that, when the closure member is raised, closure 99 can conform properly to seat 87 regardless of possible slight misalignment of the supporting screw 103. The disk 105 is held resiliently in engagement with the screw head by a compression spring 106 encircling tube 104 and acting on the disk through a washer 107 and the closure 99. Disk 105 is provided at its periphery with a plurality of dependant guide fingers 108 which are a sliding fit in an opening 109 through the thickened portion of the base section 81; the bottom of this opening being closed by a plate 110.

Clamped at its margin between the annular member 96 and an upper section 111 of the valve body is a second diaphragm 112, similar to diaphragm 97. The body sections and member 96 are held together by screws 113, visible in Fig. 5. On opposite sides of the central portion of diaphragm 112 are plates 114 which are riveted together and to the flange of an inverted cup-shaped member 115. Freely slidable in an opening through the top wall of member 115 is a screw 116 adjustably threaded in an opening through the top wall of the upper section 111. The head 117 of screw 115 serves to limit downward movement of diaphragm 112.

Mounted on the top of the upper section 111, and secured thereto by screws (not shown) threaded in openings 118 (Fig. 5), is a housing 119 which is divided by a partition 120 to form a pair of compartments 121 and 122. Compartment 121 is in communication with a recess 123 in the outer surface of a thickened portion of the top wall of the upper section 111; while compartment 122 communicates, by way of an opening 124 below it, with the space within the upper section above diaphragm 112. Extending from recess 123 is a horizontal passage 125 (Fig. 6), closed at its outer end by a threaded plug 126, from which passage there branches a generally vertical passage 127. In the annular member 96 is another passage 128, in register with passage 127 and a hole in the diphragm, which communicates through a branch opening 129 with the space between diaphragms 97 and 112. Within enlarged adjoining end portions of the passages 127 and 128 is a tube 130 which cooperates with the hole in the diaphragm and thereby prevents, in assembly of the valve, possible obstruction of the passages by misplacement of the diaphragm. It will be apparent from the foregoing that the compartment 121 corresponds to the interior of housing 28 of Figs. 1–3, and that the passages interconnecting compartment 121 with the space between the diaphragms correspond to the pipe 41 of Figs. 1–3.

Corresponding to the pipe 39 of Figs. 1–3, there is shown in broken lines in Fig. 6 a series of aligned vertical passages, indicated by the single reference numeral 131, through marginal portions of base section 81, member 96, and upper section 111. Passage 131 communicates at its lower end through an opening 132 with the inlet 82, and at its upper end with a horizontal passage 133 in a thickened portion of the top wall of the upper section, which passage is closed at its outer end by a threaded plug 134. In communication with the passage 133 is a pair of adjustable jet assemblies generally indicated by the numerals 135 and 136. A similar pair of jet assemblies 137 and 138 communicates with another horizontal passage 139 (Fig. 5) in the top wall of the upper section, which passage terminates in a vent opening 140. Jet assemblies 136 and 138 are shown in section in Fig. 7. The general structure of the jet assemblies is disclosed in detail in U. S. Patent No. 2,232,970 granted to me February 25, 1941, and will not be further described here. As is seen in Fig. 7, a blade-like armature 141 cooperates with the open ends of jets 136 and 138, and another armature 142 (Fig. 5) cooperates in the same manner with jets 135 and 137.

For actuating armature 141 there is an electromagnet 143 comprising an L-shaped core 144 (secured to a bracket 145 which in turn is secured to the top surface of the upper section) to the vertical arm of which is bolted a soft-iron rod 146 around which is a coil winding 147 having leads 148 connected to terminal posts 149 insulatingly and sealingly mounted in the top wall of housing 119. The armature 141 is fulcrumed on the beveled end of the horizontal arm of core 144 and is biased into engagement with jet 136 by a compression spring 150, the outer end of the spring being clamped beneath an extension 151 of bracket 145. As is seen in Figs. 5 and 6, armature 141 is provided with small lateral projections 152 which are loosely received in openings through the sides 153 of an upwardly-turned portion 154 (Fig. 7) of bracket 145 and serve to prevent displacement of the armature. The bracket portion 154 is apertured to supportingly receive the end of rod 146 adjacent the armature and toward which end the armature is attracted when the electromagnet is energized. For actuating the other armature 142 there is another electromagnet 155 which is identical in construction with electromagnet 143 and therefore will not be described in detail.

The valve shown in Figs. 5–7 operates in the same manner as does the valve of Figs. 1–3 and it is believed that the correspondence of elements in the individual valves will be apparent, from the foregoing descriptions, to those skilled in the art.

It is apparent that the means, described hereinabove, for moving the closure member to an "intermediate" position (Fig. 3) also has utility in connection with a valve of the simple open-closed type, i. e., one wherein (for example) the bottom seat 17 and cooperating closure 22 are omitted. In such a valve, the closure 21 is normally operated into and out of engagement with seat 16; and, by the additional means, is operated from its raised or fully-open position to a depressed position, close to the seat 16, wherein flow through the valve is reduced.

The embodiments of the invention herein shown and described are obviously susceptible of still further modification without departing from the spirit of the invention, and I intend therefore to be limited only by the scope of the appended claims.

I claim as my invention:

1. In a fluid control valve: a valve body having an inlet and an outlet; a partition separating said inlet and said outlet and having a main port opening and a restricted port opening, each adapted to interconnect the inlet and the outlet; a closure member for controlling said openings and movable in opposite directions between a first position, wherein both of said openings are closed, and a second position, wherein only said main opening is closed; the arrangement being such that said main opening is open when the closure member is in a third position intermediate said first and second positions; a compound fluid-pressure motor for operating the closure member, said motor comprising means defining an enclosed space and having a movable wall, and a movable partition dividing said space into one pressure chamber, defined in part by said movable wall, and another pressure chamber; means operatively interconnecting said movable wall and the closure member; a source of fluid pressure; first pilot-valve means for so controlling application of said fluid pressure to said one of the pressure chambers that the closure member is selectively operated to its first or, normally, to its second position; second pilot-valve means for controlling application of the fluid pressure to said other of the pressure chambers to move said partition; and means whereby movement of the partition can effect such movement of the movable wall as to move the closure member from its second to its third position.

2. In a fluid control valve: a valve body having an inlet and an outlet; a partition separating said inlet and said outlet and having a main port opening and a restricted port opening, each adapted to interconnect the inlet and the outlet; a closure member for controlling said openings and movable in opposite directions between a first position, wherein both of said openings are closed, and a second position, wherein only said main opening is closed; the arrangement being such that said main opening is open when the closure member is in a third position intermediate said first and second positions; said closure member being biased to said first position; a compound fluid-pressure motor for operating the closure member, said motor comprising means defining an enclosed space, a first and a second partition dividing said space into a first pressure chamber, defined in part by said first partition, a second pressure chamber between said partitions, and a third pressure chamber defined in part by said second partition; means operatively interconnecting said first partition and the closure member; a source of superatmospheric fluid pressure; means for constantly applying said pressure to said first chamber; pilot-valve means for applying said pressure to said second chamber to equalize the pressure on opposite sides of said first partition so that the closure member is moved to its first position under the force of said bias, or for venting said second chamber so that the closure member is moved to its second position by the pressure in said first chamber; additional pilot-valve means for applying said pressure to said third chamber, said second partition moving, when subjected to said pressure, to effect movement of the first partition in a direction to move the closure member from its second toward its first position; and means so limiting said movement of the second partition that the closure member is arrested in its third position.

3. In a fluid control valve: a valve body having an inlet and an outlet; a partition separating said inlet and said outlet and having a main port opening and a restricted port opening, each adapted to interconnect the inlet and the outlet; a closure member for controlling said openings and movable in opposite directions between a first position, wherein both of said openings are closed, and a second position, wherein only said main opening is closed; the arrangement being such that said main opening is open when the closure member is in a third position intermediate said first and second positions; said closure member being biased to said first position; a compound fluid-pressure motor for operating the closure member, said motor comprising a first flexible diaphragm covering an opening through a portion of said valve body in communication with said inlet, said inlet constituting a first pressure chamber, means including a second flexible diaphragm defining a second pressure chamber at the surface of said first diaphragm opposite said first chamber, and means defining with said second diaphragm a third pressure chamber at the surface of the second diaphragm opposite said second chamber; means operatively interconnecting said first diaphragm and the closure member; pilot-valve means for applying the pressure of the fluid in the inlet of the valve body to said second chamber to equalize the pressure on opposite surfaces of said first diaphragm so that the closure member is moved to its first position under the force of said bias, or for venting said second chamber so that the closure member is moved to its second position by the pressure in said first chamber; additional pilot-valve means for applying said inlet pressure to said third chamber, said second diaphragm moving, when subjected to said pressure, to effect movement of the first diaphragm in a direction to move the closure member from its second toward its first position; and means so limiting said movement of the second diaphragm that the closure member is arrested in its third position.

4. In a fluid control valve: a valve body having an inlet and an outlet; a partition separating said inlet and said outlet and having a main port opening and a restricted port opening, each adapted to interconnect the inlet and the outlet; a closure member for controlling said openings and movable in opposite directions between a first position, wherein both of said openings are closed, and a second position, wherein only said main opening is closed; the arrangement being such that said main opening is open when the closure member is in a third position intermediate said first and second positions; said closure member being biased to said first position; a compound fluid-pressure motor for operating the closure member, said motor comprising a first flexible diaphragm covering an opening through a portion of said valve body in communication with said inlet, said inlet constituting a first pressure chamber, means including a second flexible diaphragm defining a second pressure chamber at the surface of said first diaphragm opposite said first chamber, said diaphragms being disposed in substantially parallel planes and engageable with each other, and means defining with said second diaphragm a third pressure chamber at the surface of the second diaphragm opposite said second chamber; means operatively interconnecting said first diaphragm and the closure member; pilot-valve means for applying the pressure of the fluid in the inlet of the valve body to said second chamber to equalize the pressure on opposite surfaces of said first diaphragm so that the closure member is moved to its first position under the force of said bias, or for venting said second chamber so that the closure member is normally moved to its second position by the pressure in said first chamber; additional pilot-valve means for applying said inlet pressure to said third chamber, while the second chamber is vented, so as to move said second diaphragm into engagement with the first diaphragm and to move the same from its second toward its first position; and means so limiting said movement of the second diaphragm that the closure member is arrested in its third position.

5. In a fluid control valve: a valve body having an inlet chamber and an outlet chamber; a partition separating said chambers and having a port opening therethrough; a first valve seat formed at the inlet end of said port opening, and a second valve seat at the outlet end thereof; a closure member cooperable with said seats and comprising a pair of interconnected and spaced-apart closures; said closure member being movable between a first position, wherein one of said closures is in engagement with said inlet seat, and a second position, wherein the other of the closures is in engagement with said outlet seat; the closure member being adapted to assume a third position, intermediate said first and second positions, wherein both of the closures are out of engagement with the seats; said port opening having a restricted opening branching therefrom intermediate the seats and communicating with said outlet chamber; a compound fluid-pressure motor for operating the closure member, said motor comprising means defining an enclosed space and having a movable wall, and a movable partition dividing said space into one pressure chamber, defined in part by said movable wall, and another pressure chamber; means operatively interconnecting said movable wall and the closure member; a source of fluid pressure; first pilot-valve means for so controlling application of said fluid pressure to said one of the pressure chambers that the closure member is selectively operated to its first or, normally, to its second position; second pilot-valve means for controlling application of the fluid pressure to said other of the pressure chambers to move said partition; and means whereby movement of the partition can effect such movement of the movable wall as to move the closure member from its second to its third position.

6. In a fluid control valve: a valve body having an inlet and an outlet and a partition separating the same, said partition having a port opening therethrough provided at its inlet end with a valve seat; a closure biased into engagement with said seat and movable therefrom to a full-flow position; a first flexible diaphragm attached to said closure and covering an opening through a portion of said valve body adjacent said seat and in communication with said inlet, said inlet constituting a first pressure chamber; means, including a second flexible diaphragm, defining a second pressure chamber at the outer surface of said first diaphragm; means defining with said second diaphragm a third pressure chamber at the surface of the second diaphragm opposite said second chamber; pilot-valve means for applying the pressure of the fluid of said inlet to said second chamber to equalize the pressure on opposite surfaces of said first diaphragm so that the closure is moved to its biased position in engagement with the seat, or for venting the second chamber so that the closure is moved to its full-flow position by the pressure in said first chamber; additional pilot-valve means for applying said inlet pressure to said third chamber, while the second chamber is vented, to effect movement of said second diaphragm; means whereby said movement of the second diaphragm effects movement of the first diaphragm in a direction tending to seat the closure; and means so limiting said movement of the second diaphragm that the closure is arrested in a position wherein flow through the valve is reduced.

WILLIAM A. RAY.

REFERENCES CITED

The following references are of record in the file of this patent:

UNITED STATES PATENTS

| Number | Name | Date |
| --- | --- | --- |
| 2,317,639 | Ray | Apr. 27, 1943 |
| 2,331,502 | Ray | Oct. 12, 1943 |
| 2,382,941 | Moore | Aug. 14, 1945 |